(12) United States Patent
Tenghamn et al.

(10) Patent No.: US 10,139,505 B2
(45) Date of Patent: Nov. 27, 2018

(54) DIGITAL SENSOR STREAMERS AND APPLICATIONS THEREOF

(75) Inventors: Stig Rune Lennart Tenghamn, Katy, TX (US); Frederick James Barr, Pearland, TX (US)

(73) Assignee: PGS GEOPHYSICAL AS, Oslo (NO)

( * ) Notice: Subject to any disclaimer, the term of this patent is extended or adjusted under 35 U.S.C. 154(b) by 984 days.

(21) Appl. No.: 13/206,002

(22) Filed: Aug. 9, 2011

(65) Prior Publication Data

US 2013/0039149 A1   Feb. 14, 2013

(51) Int. Cl.
 *G01V 1/38* (2006.01)
 *G01V 1/16* (2006.01)
 *G01V 1/20* (2006.01)

(52) U.S. Cl.
 CPC .............. *G01V 1/164* (2013.01); *G01V 1/201* (2013.01)

(58) Field of Classification Search
 CPC ........ G01V 1/3808; G01V 1/201; G01V 1/38; G01V 1/164
 USPC ......................................................... 367/20
 See application file for complete search history.

(56) References Cited

U.S. PATENT DOCUMENTS

| 3,397,358 | A |   | 8/1968 | Allenden |
| 3,739,326 | A | * | 6/1973 | Kerr et al. ..................... 367/159 |
| 3,832,762 | A |   | 9/1974 | Johnston |
| 4,164,733 | A | * | 8/1979 | Landsburg .......... H03M 1/1295 324/99 D |
| 4,481,611 | A |   | 11/1984 | Burrage |
| 4,616,349 | A | * | 10/1986 | Shirley .................... H03M 3/02 341/143 |
| 4,926,178 | A | * | 5/1990 | Mallinson ..................... 341/143 |
| 5,070,483 | A |   | 12/1991 | Berni |
| 5,109,362 | A |   | 4/1992 | Berni |
| 5,134,882 | A |   | 8/1992 | Taylor |

(Continued)

FOREIGN PATENT DOCUMENTS

| GB | 2402745 |   | 12/2004 |
| GB | 2489781 | A | 10/2012 |

(Continued)

OTHER PUBLICATIONS

Lewis et al, "Simulation of a Micromachined Digital Accelerometer in SIMULINK and PSPICE", Control '96, UKACC International Conference on (Conf. Publ. No. 427) (vol. 1 ), Sep. 1996.*

(Continued)

*Primary Examiner* — Ian J Lobo
(74) *Attorney, Agent, or Firm* — Patterson & Sheridan, LLP

(57) ABSTRACT

A disclosed data acquisition system includes one or more streamers having multiple spaced apart sensor units. At least one sensor unit includes at least one digital sensor employing a quantized feedback loop to produce a digital output signal. A data recording system collects and stores data from the sensor units. The quantized feedback loop may be adapted to exert a quantized force on the sensing element. A described method for acquiring data includes deploying at least one streamer having multiple spaced apart sensor units, where at least a portion of the sensor units include a digital sensor employing a quantized feedback loop to produce a digital output signal. A stimulus event is triggered. Data is received from the sensor units and stored.

20 Claims, 5 Drawing Sheets

(56) References Cited

U.S. PATENT DOCUMENTS

| | | |
|---|---|---|
| 5,170,566 A | 12/1992 | Fowler et al. |
| 5,327,216 A | 7/1994 | Berni |
| 5,723,790 A | 3/1998 | Andersson |
| 5,790,472 A | 8/1998 | Workman et al. |
| 5,903,349 A | 5/1999 | Vohra et al. |
| 5,955,884 A | 9/1999 | Payton et al. |
| 6,011,752 A | 1/2000 | Ambs et al. |
| 6,144,342 A | 11/2000 | Bertheas et al. |
| 6,438,069 B1 | 8/2002 | Ross et al. |
| 6,452,531 B1* | 9/2002 | Miller et al. ............... 341/172 |
| 6,574,567 B2 | 6/2003 | Martinez |
| 6,684,160 B1 | 1/2004 | Ozbek et al. |
| 6,788,618 B2 | 9/2004 | Clayton et al. |
| 6,842,006 B2 | 1/2005 | Conti et al. |
| 6,873,571 B2 | 3/2005 | Clayton et al. |
| 6,879,542 B2 | 4/2005 | Didier et al. |
| 6,882,938 B2 | 4/2005 | Vaage et al. |
| 6,901,028 B2 | 5/2005 | Clayton et al. |
| 6,921,894 B2 | 7/2005 | Swierkowski |
| 6,985,403 B2 | 1/2006 | Nicholson |
| 7,116,036 B2 | 10/2006 | Balasubramaniam et al. |
| 7,145,833 B1 | 12/2006 | Hoogeveen |
| 7,222,579 B2 | 5/2007 | Hillesund et al. |
| 7,298,672 B1 | 11/2007 | Tenghamn |
| 7,331,803 B2 | 2/2008 | Steigerwald |
| 7,376,045 B2 | 5/2008 | Falkenberg et al. |
| 7,409,919 B2 | 8/2008 | Hoogeveen et al. |
| 7,423,929 B1 | 9/2008 | Olivier |
| 7,642,784 B2 | 1/2010 | Reddig et al. |
| 7,660,203 B2 | 2/2010 | Barakat et al. |
| 7,667,375 B2 | 2/2010 | Berkcan |
| 7,671,598 B2 | 3/2010 | Ronaess et al. |
| 7,679,990 B2 | 3/2010 | Herkenhoff et al. |
| 7,754,018 B2 | 7/2010 | Lepage et al. |
| 7,800,976 B2 | 9/2010 | Stokkeland et al. |
| 8,228,759 B2 | 7/2012 | Ray |
| 8,325,922 B1 | 12/2012 | Sun et al. |
| 8,339,896 B2 | 12/2012 | Van Borselen et al. |
| 8,358,560 B2* | 1/2013 | Muyzert et al. ............. 367/20 |
| 9,285,493 B2 | 3/2016 | Tenghamn |
| 2003/0140699 A1 | 7/2003 | Pike et al. |
| 2005/0194201 A1 | 9/2005 | Tenghamn et al. |
| 2006/0186887 A1 | 8/2006 | Strack et al. |
| 2006/0239117 A1* | 10/2006 | Singh et al. ................. 367/20 |
| 2007/0230721 A1 | 10/2007 | White et al. |
| 2007/0247971 A1 | 10/2007 | Semb et al. |
| 2008/0253225 A1 | 10/2008 | Welker et al. |
| 2009/0147619 A1 | 6/2009 | Welker |
| 2010/0008184 A1 | 1/2010 | Hegna et al. |
| 2010/0116054 A1* | 5/2010 | Paulson ..................... 341/143 |
| 2011/0032132 A1* | 2/2011 | Lin ..................... H03M 3/424 |
| | | 341/143 |
| 2011/0216626 A1* | 9/2011 | Stacey et al. ............... 367/131 |

FOREIGN PATENT DOCUMENTS

| | | |
|---|---|---|
| JP | 2003042832 | 2/2003 |
| WO | WO-2004/053528 A1 | 6/2004 |

OTHER PUBLICATIONS

United Kingdom Search Report, Mailing Date: Dec. 6, 2012.
PGS, "OptoSeis Reservoir Imaging", (Online) (Retrieved on May 5, 2010) Retrieved from the internet URL <http://www.pgs.com/upload/208514/PGS%20OptoSeis.pdf>, 6 pgs.
Seth, Samir N., "Reservoir Optimization: Permanent Seismic Monitoring Using Fiber Optics", *PGS Optomism*, (May 19, 2009), 29 pgs.
Seeger, Joseph I., et al., "Sense Finger Dynamics in a $\Sigma\Delta$ Force-Feedback Gyroscope", *Technical Digest of the Solid-State Sensor and Actuator Workshop*, (Jun. 2000), pp. 296-299, Hilton Head Island, SC.
Rickert, William T., et al., "Systems and Methods for Wireless Communication in a Geophysical Aurvey Streamer", U.S. Appl. NO. 13/073,832, filed Mar. 28, 2011.
Tenghamn, Stig Rune L., "Systems and Methods for Energy Harvesting in a Geophysical Survey Streamer", U.S. Appl. No. 13/073,823, filed Mar. 28, 2011.
Chandrakasan, Anantha et al., "Trends in Low Power Digital Signal Processing", *Proceedings of IEEE International Symposium on Circuits and Systems*, (1998), pp. 604-607, vol. 4, Monterey, CA (USA).
Mitcheson, P.D. et al., "MEMS Electrostatic Micropower Generator for Low Frequency Operation", *Sensors and Actuators A*, (2004), pp. 523-529, vol. 115.
Ergen, Sinem C., "Zigbee/IEEE 802.15.4 Summary", *Advanced Technology Lab of National Semiconductor*, (Sep. 4, 2004), 37 pgs.
Lewis, Christopher P., et al., "Simulation of Micromachined Digital Accelerometer in SIMULINK and PSPICE", *UKACC International Conference on Control*, (Sep. 1996), pp. 205-209, vol. 1, Conf. Publ. No. 427.
Taner, Turhan (Tury) M., "Semblance and Other Similarity Measurements", (Nov. 1996), 6 pgs.
Lee, Haksue et al., "A Micro-Machined Piezoelectric Flexural-Mode Hydrophone with Air Backing: Benefit of Air Backing for Enhancing Sensitivity", J. Acoustical Society of America, Sep. 2010, pp. 1033-1044, vol. 128, No. 3.
Choi, Sungjoon et al., "A Micro-Machined Piezoelectric Flexural-Mode Hydrophone with Air Backing: A Hydrostatic Pressure-Balancing Mechanism for Integrity Preservation", J. Acoustical Society of America, Sep. 2010, pp. 1021-1032, vol. 128, No. 3.
Posthumus, B. J., "Deghosting Using a Twin Streamer Configuration", Geophysical Prospecting, (1993), pp. 267-286, vol. 41.
Spitz, Simon et al., "Simultaneous Source Separation: A Prediction-Subtraction Approach", Society of Exploration Geophysicists Annual Meeting, Las Vegas, Nevada., (2008), pp. 2811-2815.
Akerberg, Peeter et al., "Simultaneous Source Separation by Sparse Radon Transform", Society of Exploration Geophysicists Annual Meeting, Las Vegas, Neveda., (2008), pp. 2801-2805.
Smith, Paddy "It's All Acquisition's Fault", Advanced Time-Lapse Seismic Acquisition Improves Quality and Delivers Results More Quickly, 4-D Seismic, EPmag.com,(Mar. 2011), pp. 49-51.
Constable, Steven et al., "An Introduction to Marine Controlled-Source Electromagnetic Methods for Hydrocarbon Exploration", Geophysics, (Mar.-Apr. 2007), pp. WA3-WA12, vol. 72, No. 2.
Egan, Mark et al., "Full Deghosting of OBC Data With Over/Under Source Acquisition", Society of Exploration Geophysicists, San Antonio Annual Meeting, (2007), pp. 31-35.
Monk, David J., "Wavefield Separation of Twin Streamer Data", First Break Mar. 1990, pp. 96-104, vol. 8, No. 3.
US Non-Final Office Action, dated Sep. 11, 2013, U.S. Appl. No. 13/073,832, "Wireless Communication in a Geophysical Survey Streamer", filed Mar. 28, 2011, 20 pgs.
UK Patent Act 1977, Examination Report under Section 18(3), mailed Nov. 26, 2014, in the prosecution of patent application GB121420701, 4 pages.
Lewis & Kraft, "Simulation of a Micromachined Digital Accelerometer in SIMULINK and PSPICE", UKACC International Conference on control "96", 1996, pp. 205-209, Conf. Publ. No. 427, vol. 1.

* cited by examiner

DIGITAL SENSOR STREAMERS AND APPLICATIONS THEREOF

BACKGROUND

In the field of geophysical prospecting, the knowledge of the subsurface structure of the earth is useful for finding and extracting valuable mineral resources such as oil and natural gas. A well-known tool of geophysical prospecting is a "seismic survey." In a seismic survey, acoustic waves produced by one or more sources are transmitted into the earth as an acoustic signal. When the acoustic signal encounters an interface between two subsurface strata having different acoustic impedances, a portion of the acoustic signal is reflected back to the earth's surface. Sensors detect these reflected portions of the acoustic signal, and outputs of the sensors are recorded as data. Seismic data processing techniques are then applied to the collected data to estimate the subsurface structure. Such surveys can be performed on land or in water.

In a typical marine seismic survey, multiple streamer cables are towed behind a vessel. A typical streamer includes multiple seismic sensors positioned at spaced intervals along its length. Several streamers are often positioned in parallel over a survey region. One or more seismic sources (such as air guns or marine vibrators) are also normally towed behind the vessel.

The signals received by sensors in marine streamers are contaminated with noise to varying degrees. This noise typically has many different origins. One major source of noise is "tow noise" resulting from pressure fluctuations and vibrations created as the streamer is pulled through the water by the vessel.

Currently, one of the main techniques used to reduce tow noise involves grouping adjacent sensors and hard-wiring the outputs of the sensors in each group together to sum their respective analog output signals. A typical sensor group contains eight to sixteen spaced apart sensors. Each group may span between 10 and 20 meters. Since the individual sensors in each group are fairly closely spaced, it is assumed that all the sensors in a given group receive substantially the same seismic signal. The seismic signal is therefore reinforced by the summing of the analog output signals of the hydrophones of the group and the particle motion sensors of their corresponding group. Random and uncorrelated noise affecting each sensor, on the other hand, tends to be cancelled out by the summing process. The gain of eight to sixteen over the output of an individual sensor provides quite good rejection of random noise.

BRIEF DESCRIPTION OF THE DRAWINGS

A better understanding of the various disclosed embodiments can be obtained when the detailed description is considered in conjunction with the attached drawings, in which:

FIG. 6 is a diagram of a first illustrative digital sensor embodiment;

It should be understood that the drawings and detailed description do not limit the disclosure, but on the contrary, they provide the foundation for understanding all modifications, equivalents, and alternatives falling within the scope of the appended claims.

DETAILED DESCRIPTION

At least some of the noise affecting the sensors in marine seismic streamers is not truly random and uncorrelated. For example the sensor noise created by the "thrumming" of the streamers is correlated between sensors. As a result, the summing of the analog output signals of multiple adjacent sensors in groups may not be very effective in reducing such noise. Such problems may be at least partly addressed by acquiring individual sensor data from the sensor units without incurring excessive power demands.

Accordingly, there is disclosed herein a data acquisition system with one or more streamers having multiple spaced apart sensor units. At least one sensor unit includes at least one digital sensor employing a quantized feedback loop to produce a digital output signal. A data recording system collects and stores data from the sensor units. The digital sensor(s) may include a sensing element adapted to move or deform in response to an input stimulus. The quantized feedback loop may be adapted to exert a quantized force on the sensing element. A described method for acquiring data includes deploying at least one streamer having multiple spaced apart sensor units, where at least a portion of the sensor units include a digital sensor employing a quantized feedback loop to produce a digital output signal. A stimulus event is triggered. Data is received from the sensor units and stored.

Figure 1:
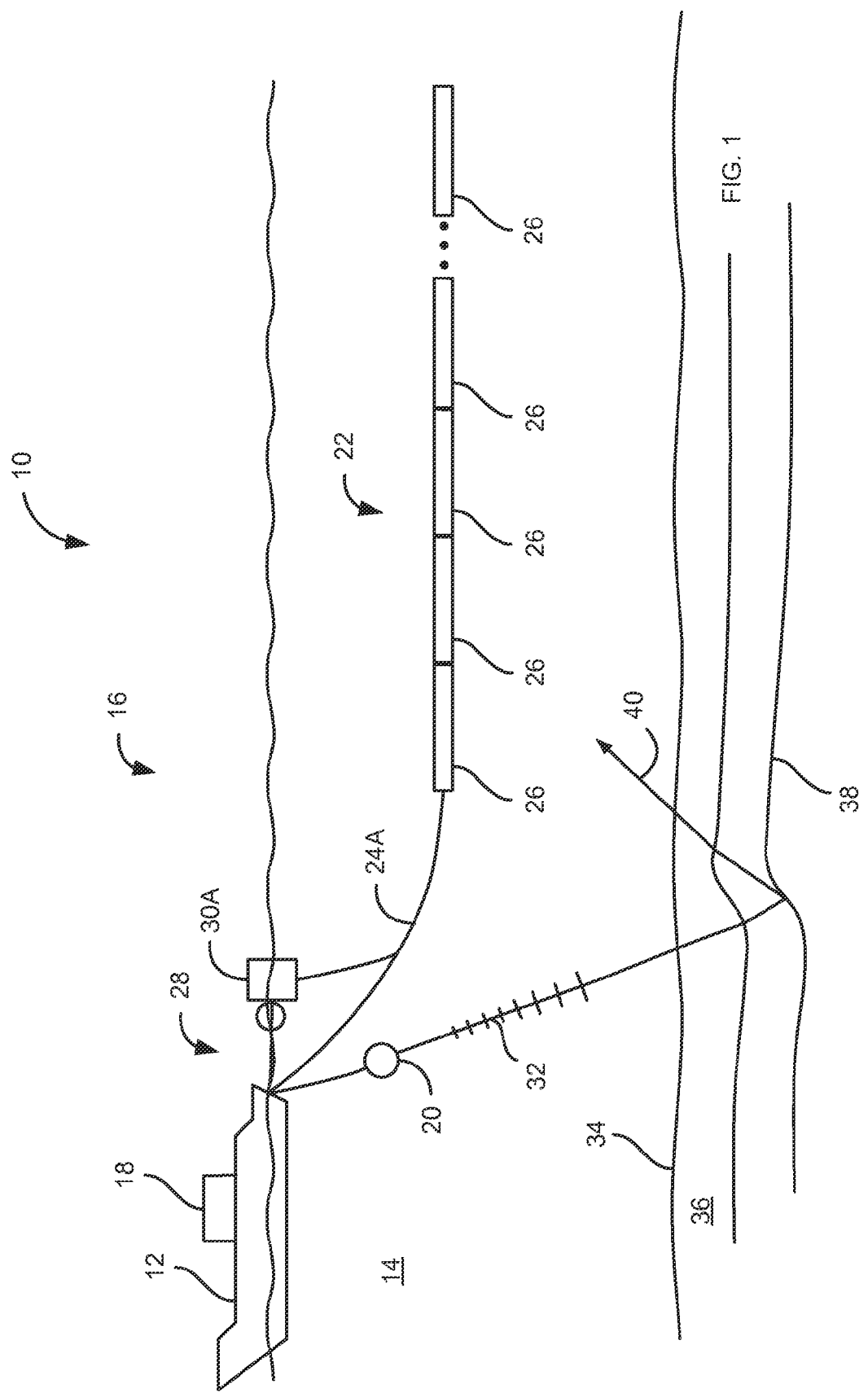
FIG. 1 is a side elevation view of an illustrative embodiment of a marine geophysical survey system performing a seismic survey, where the system includes multiple streamers.

The principles and operation of the disclosed embodiments are best understood in a suitable usage context. Accordingly, FIG. 1 is a side elevation view of an illustrative marine geophysical survey system 10 performing a marine seismic survey. A survey vessel or ship 12 is moving along the surface of a body of water 14, such as a lake or an ocean. A data acquisition system 16 of the survey system 10 includes a data recording system 18 aboard the ship 12. The data acquisition system 16 also includes a seismic source 20 and a sensor array 22 towed through the rater 14 by the ship 12.

As described in more detail below, the sensor array 22 includes multiple spaced apart sensor units. Each sensor unit includes one or more sensors that detect seismic signals and produce output signals indicative of the seismic signals. The sensor units of the sensor array 22 span a two-dimensional area. The data recording system 18 controls the collection and storage of measurement data from the sensor units and, in most cases, also controls the firing of the source 20.

Figure 2:
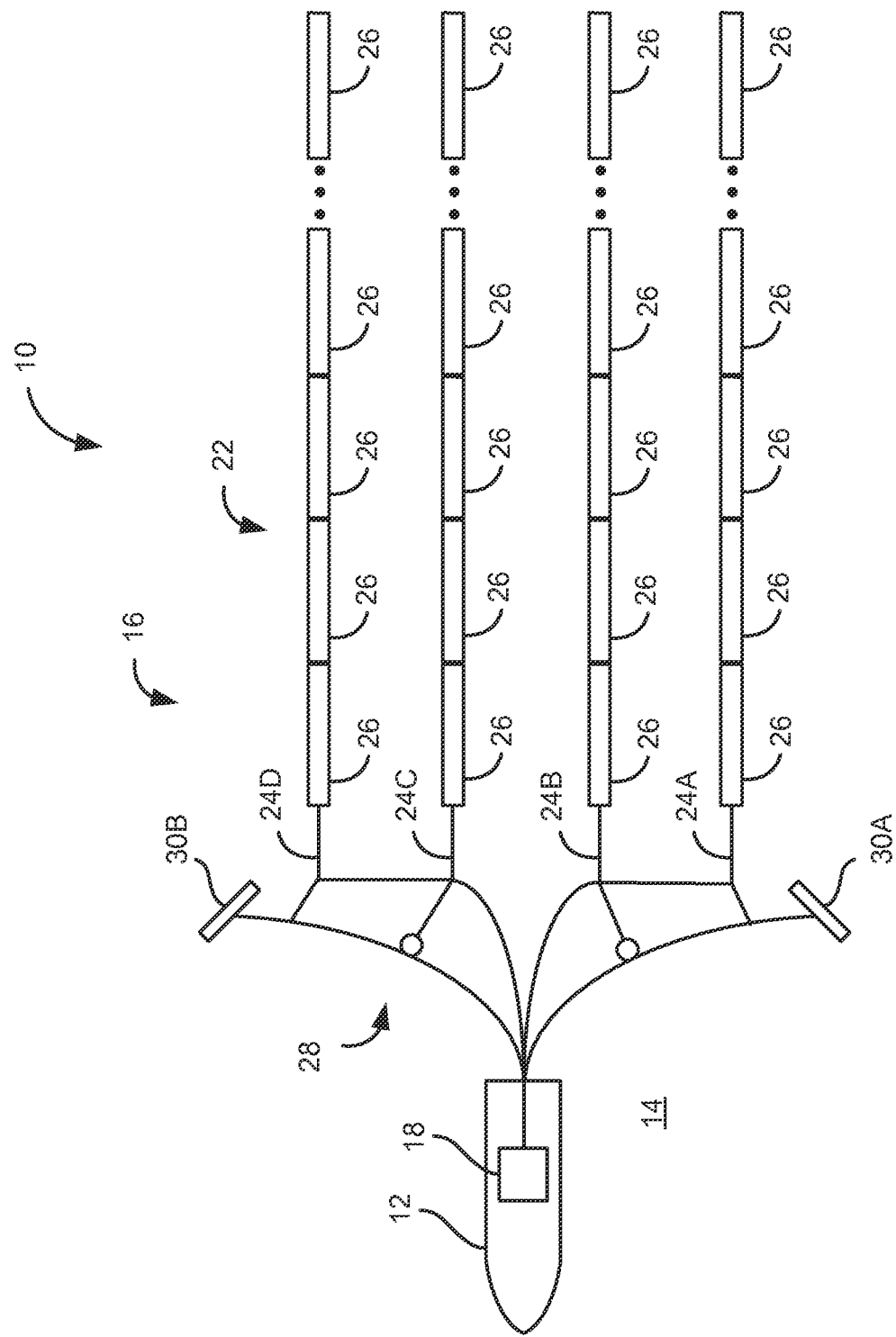
FIG. 2 is a top plan view of the marine geophysical survey system of FIG. 1.

FIG. 2 is a top plan view of the marine seismic survey system 10 of FIG. 1. Referring to FIGS. 1 and 2, the multiple spaced apart sensor units of the sensor array 22 are housed in four sensor cables or streamers 24A-24D. Each of the streamers 24A-24D includes multiple streamer sections 26 connected end to end. Each of the streamer sections 26 includes multiple sensor units. The streamers 24A-24D are towed via a harness 28 that produces a desired arrangement of the streamers 24A-24D. The harness 28 includes multiple interconnected cables and a pair of paravanes 30A and 30B connected to opposite sides of the harness 28. As the ship 12 tows the harness 28 through the water 14, the paravanes 30A and 30B pull the sides of the harness 28 in opposite directions, transverse to a direction of travel of the ship 12. The illustrated harness 28 is merely one possible design—many other harness designs are known and would also be suitable. Electrical conductors and/or fiber optic cables connect the sensor units in the streamer sections 26 of the streamers 24A-24D to the data recording system 18 aboard the ship 12.

Referring back to FIG. 1, the seismic source 20 produces acoustic waves 32 under the control of the data recording system 18, e.g. at selected times. The seismic source 20 may be or include, for example, are air gun, a vibrator, or other device. The acoustic waves 32 travel through the water 14 and into a subsurface 36 below a bottom surface 34. When the acoustic waves 32 encounter changes in acoustic impedance (e.g., at boundaries or layers between strata), portions of the acoustic waves 32 are reflected. The portions of the acoustic waves 32 reflected from subsurface layers are called "seismic reflections." In FIG. 1, one such seismic reflection is shown from an interface 38 and labeled "40."

As described in more detail below, sensor units of the sensor array 22, housed in the streamer sections 26 of the streamers 24A-24D, detect these seismic reflections and produce output signals indicative of the seismic reflections. The output signals produced by the sensor units are recorded by the data recording system 18 aboard the ship 12. The recorded signals can be processed and later interpreted to infer structure of, fluid content of, and/or composition of rock formations in the subsurface 36.

In the embodiment of FIGS. 1 and 2, the streamer sections 26 of the streamers 24A-24D may be substantially identical and interchangeable. This is advantageous in that if there is a problem with one of the streamer sections 26, the problematic streamer section 26 can be replaced by any other spare streamer section 26.

Figure 3:
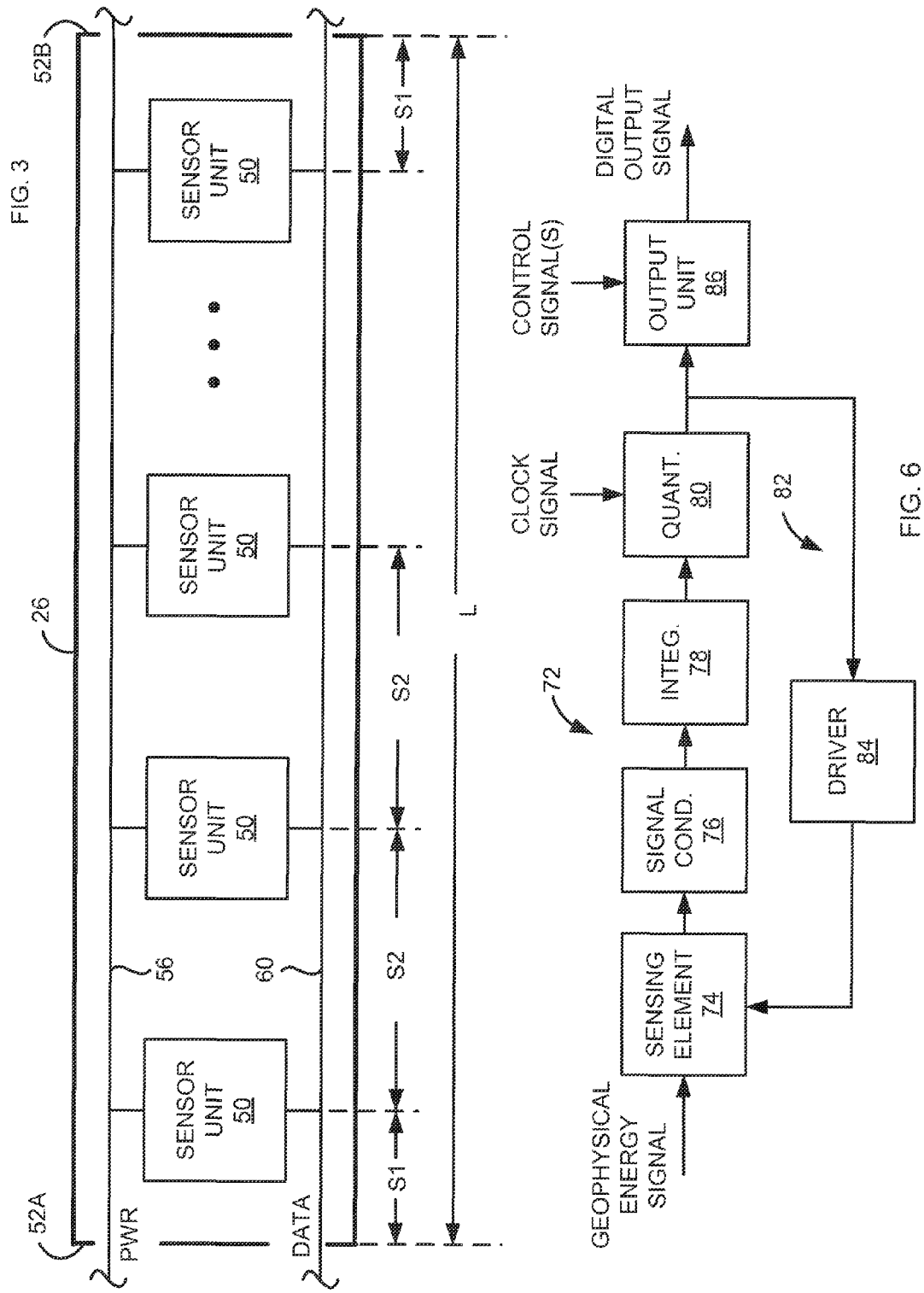
FIG. 3 is a schematic representation of an illustrative marine streamer section.

FIG. 3 shows an illustrative embodiment of one of the streamer sections 26 of the streamers 24A-24D of FIGS. 1 and 2. In the embodiment of FIG. 3, the streamer section 26 includes multiple spaced apart sensor units 50, where each of the sensor units 50 includes at least one seismic sensor as described in more detail below. The streamer section 26 may be substantially cylindrical, and has two opposed ends 52A and 52B. The streamer section 26 has a length L, where L is expected to be between about 164 feet (50 meters) and 328 feet (100 meters), with sensor unit spacings of S1 from the cable ends 52A, 52B, and spacings of S2 from each other, where S1 and S2 are each expected to be less than 4.9 feet (1.5 meters). In some embodiments S2 may lie in the range between 4 inches (10 cm) and 40 inches (100 cm), or in the narrower range between 7 inches (18 cm) and 14 inches (36 cm). Each of the ends 52A and 529 has one or more connectors for electrical power and data signals.

In at least some streamer embodiments, the sensor units 50 are partitioned into groups of N sensor units, where N is preferably between about 4 and approximately 64. When grouped, the sensor units 50 in each group are connected to a common group control unit. Each group control unit may receive digital data signals from the corresponding sensor units 50, and produce a single output data stream that conveys the data from the group. The output data stream may be produced using, for example, data compression techniques, time division multiplexing techniques, and/or frequency division multiplexing techniques.

In the embodiment of FIG. 3, a power distribution bus 56 and a data bus 60 span the length of the streamer section 26 between the one or more connectors at the ends 52A and 529. Each of the sensor units 50 within the streamer 26 is coupled to the power distribution bus 56 and the data bus 60. The power distribution bus 56 includes electrical conductors for providing electrical power to the sensor units 50. The data bus 60 includes electrical conductors and/or fiber optic cables for conveying output data streams produced by the sensor units 50. The data bus 60 is also used to convey output data streams produced by other sensor units within other streamer sections connected to the end 52B as well as commands from the recording system 18.

In the embodiment of FIG. 3, the end 52A of the streamer 26 is closest to the data recording system 18 aboard the ship 12, and the output data streams produced by the sensor units 50 within the streamer section 26 are conveyed out of the streamer section 26 via electrical conductors and/or fiber optic cables of the data bus 60 terminating at the one or more connectors at the end 52A. Additional electrical conductors and/or fiber optic cables of the data bus 60 extend between the one or more connectors at the end 52B and the one or more connectors at the end 52A to convey output data streams produced by other sensor units within other streamer sections connected to the end 52B.

The streamer section 26 of FIG. 3 includes a jacket covering an exterior of the streamer sections 26, and one or more strength members extending along the length of the streamer sections 26 inside the jacket. Suitable streamer section construction techniques are described in U.S. Pat. No. 7,298,672 granted to Tenghamn et al., incorporated herein by reference in its entirety. Other streamer design and construction techniques are also known and can be used.

Electrical power requirements and streamer weights often limit a number of sensors that can be located in streamer sections. As the number of sensors in a system increases, the power requirement of the system also increases. The weights of the streamers increase due not only to the increased number of sensors, but also to the required increase in the number and cross-sectional areas of the metallic conductors providing the electrical power to the sensors. Streamer weight is an issue because each streamer must be designed so that it is neutrally buoyant when submerged in water.

In other embodiments, the power distribution bus 56 may be replaced by, or augmented by, a battery power supply system and/or an energy harvesting system. For example, the representative streamer 26 of FIG. 3 may include one or more batteries that provides some or all of the power requirements of the sensor units 50. The streamer 26 may alternatively, or in addition, include an energy harvesting device that converts vibratory motion of the streamer 26 into electrical power. As the streamer 26 is towed through the body of water 14 (see FIGS. 1 and 2), the streamer 26 expectedly experiences vibratory motion from a number of sources including vortex shedding, drag fluctuation, breathing waves, and various flow noise sources including turbulent boundary layers. Electrical energy produced by the energy harvesting system may provide some or all of the power requirements of the sensor units 50. Use of the battery power supply system and/or an energy harvesting system would expectedly reduce the number and/or cross sectional areas of the conductors of the power distribution bus 56.

Embodiments of an illustrative sensor unit 50 including one or more digital sensors are described below. Due at least in part to a digitization process with an quantized feedback signal path to the sensing element, the disclosed digital sensors may have substantially reduced size, weight, and power requirements compared to conventional sensors. At least some digital sensor embodiments may advantageously include micromachined components with miniature moving mechanical structures. Micromachining creates intricate and precisely patterned structures on relatively thick substrates through either bulk or surface processing technologies. Bulk micromachining sculpts moving pieces by removing material from the substrates. Surface micromachining involves depositing and subsequently etching thin films on the substrates, akin to common integrated circuit manufacturing processes. Both technologies produce physically smaller sensors that typically weigh less and dissipate less electrical energy.

As explained further below, the integrated digitization circuit further reduces energy consumption as compared to an analog sensor followed by a separate analog-to-digital converter. The quantized feedback restrains motion of the sensing component and in so doing it limits the analog voltages generated by the sensor. The energy consumption of such digital sensors may be expected to be as much as an order of magnitude less than that of comparable analog sensors, making it possible to have an increased number of sensors while maintaining or reducing overall power and wiring requirements for the streamer.

The use of the disclosed digital sensors enables significantly more sensor units to be positioned in each streamer section 26 (FIGS. 1-3), and consequently enables the spacing distances S1 and S2 to be reduced. The data obtained from the sensor array 22 with more closely spaced sensor units 50 may advantageously enable the development and use of better noise attenuation algorithms.

Figure 4:
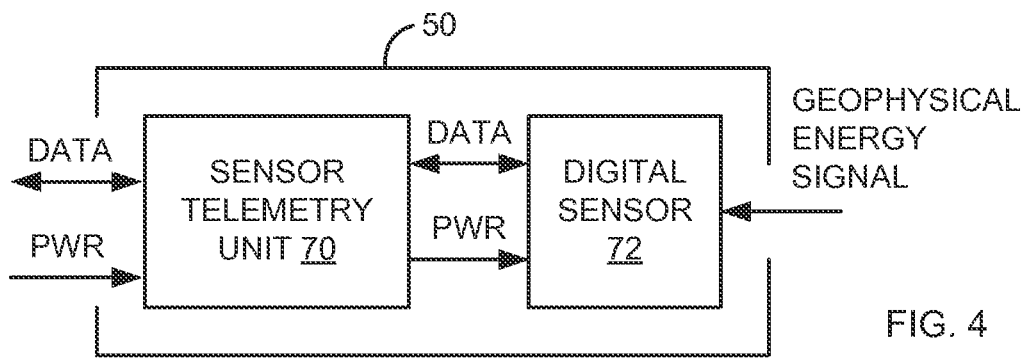
FIG. 4 is a diagram of a first illustrative sensor unit having a single digital sensor.

FIG. 4 shows an illustrative embodiment of sensor unit 50 of the streamer section 26 of FIG. 3. In the embodiment of FIG. 4, the sensor unit 50 includes a sensor telemetry unit 70 coupled to a digital sensor 72. As described below with reference to FIG. 6, the digital sensor 72 includes a quantized feedback loop and uses the quantized feedback loop to produce a digital output signal indicative of seismic wave energy. A sensing element of the digital sensor attempts to move or deform in response to an input stimulus (e.g., pressure, acceleration, or some other form of geophysical energy signal). When the sensing element receives no input stimulus, the quantized feedback loop causes the sensing element to oscillate symmetrically around a zero input or "null" position or state of deformation. The resulting quantized signal (which is a pulse density modulated signal) is a series of evenly-spaced pulses. The quantized feedback loop converts this quantized signal into a quantized restoring force that causes the sensing element to oscillate around the null position, in the presence of input stimuli, the center of oscillation tends to move away from the null position, but the quantized feedback loop responsively adjusts the quantized restoring force to minimize this deviation. The sensing element may include, for example, a flexible or movable MEMS element having electrodes for electrostatic sensing and control. This sensor design requires no separate analog-to-digital conversion step.

In the embodiment of FIG. 4, the sensor telemetry unit 70 is coupled to the power distribution bus 56 and to the data bus 60 of FIG. 3, and provides electrical power from the power distribution bus 56 to the digital sensor 72. The sensor telemetry unit 70 receives control signals from the data recording system 18 (see FIGS. 1-2) via the data bus 60, and issues control signals to the digital sensor 72. The sensor telemetry unit 70 also receives the digital output signal produced by the digital sensor 72, and provides an output data stream that includes a representation of the digital sensor output signal to the data recording system 18 via the data bus 60.

Figure 5:
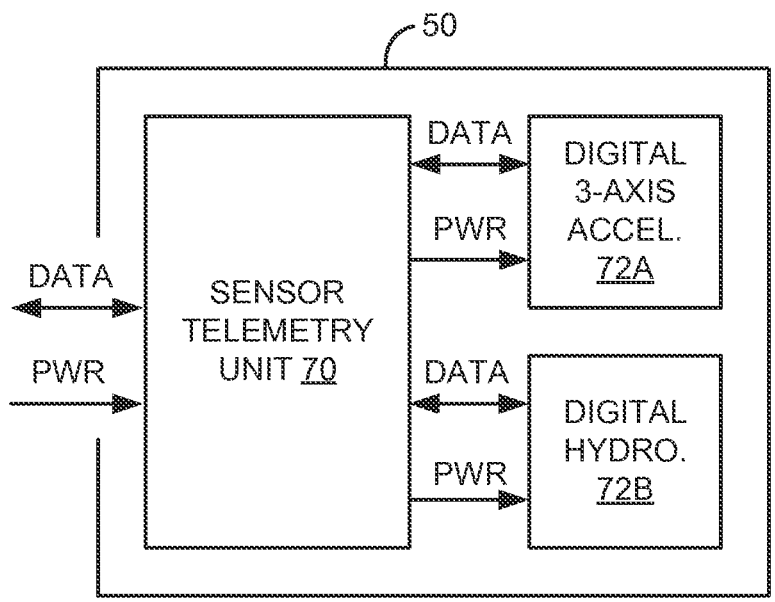
FIG. 5 is a diagram of a second illustrative sensor unit having multiple digital sensors.

FIG. 5 shows an illustrative sensor unit 50 having multiple digital sensors. In the embodiment of FIG. 5, the sensor unit 50 includes the sensor telemetry unit 70 coupled to a digital 3-axis accelerometer 72A and a digital hydrophone 72B. The digital 3-axis accelerometer 72A provides measurements of acceleration in three orthogonal directions, and the digital hydrophone 72B provides measurements of pressure within a surrounding fluid. The digital 3-axis accelerometer 72A includes a quantized feedback loop for each sensing element, and it produces three digital output signals indicative of the sensor unit's motion along three axes, including motion due to seismic wave energy. The digital hydrophone 72B also includes one or more quantized feedback loops that cooperate with the sensing element to produce a digital output signal indicative of pressure within the surrounding fluid, including changes in pressure due to seismic wave energy. One or more sensing elements within the digital 3-axis accelerometer 72A and the digital hydrophone 72B attempt to move or deform in response to an input stimulus (e.g., acceleration or pressure) but are restrained by each one's quantized feedback loop(s).

FIG. 6 is a block diagram a digital sensor embodiment 72 suitable for use in the sensor units of FIGS. 4-5. In the embodiment of FIG. 6, the digital sensor 72 includes a sensing element 74, a signal conditioning unit 76, an integrator unit 78, a quantizer unit 80, a quantized feedback path 82 with a driver unit 84, and an output unit 86. The sensing element 74 is adapted to move or deform in response to an input stimulus (e.g., pressure or acceleration). The sensing element 74 produces an electrical output signal (e.g., a voltage or a current) in response to the input stimulus. The sensing element may be or include a transducer that converts energy of the input stimulus to electrical energy. The sensing element further includes a mechanism which can be employed by the feedback path 82 to counteract the motion or deformation of the sensing element. Suitable sensing elements include a piezoresistive or piezoelectric element coupled to a mechanical member, such as a diaphragm or a suspended proof mass, that would produce an analog electrical output signal (e.g., a voltage or a current) indicative of the motion or deformation of the mechanical member if it were not constrained by the electrical energy from the quantized feedback path 82. Other suitable sensing elements include capacitively or inductively coupled electrodes that produce an electrical output signal indicative of a distance between two mechanical members, where the input stimulus causes one of the mechanical members to attempt to move or deform more than the other.

The signal conditioning unit 76 receives the output signal produced by the sensing element 74 as an input signal, and modifies or alters the input signal to produce an output signal that facilitates subsequent integration of the output signal by the integrator unit 78. The signal conditioning unit 76 may, for example, convert a voltage signal to a current signal, convert a current signal to a voltage signal, amplify the input signal, attenuate the input signal, filter the input signal, and/or shift a direct current (DC) level of the input signal.

The integrator unit 78 receives the signal produced by the signal conditioning unit 76 and integrates it over time. The integrator unit 78 may, for example, perform a first-order low-pass filter operation on the input signal. The input signal to the integrator unit 78 is indicative of a current position or state of deformity of the sensing element 74. The output signal produced by the integrator unit 78 is indicative of a cumulative sum of the position or state of deformity of the sensing element 74 over time.

The quantizer unit 80 receives the signal produced by the integrator unit 78 and a clock signal from the sensor telemetry unit 70 (see FIGS. 4 and 5) as a control input. (The clock signal frequency is higher than the highest expected frequency component of the external stimulus, usually by a factor of about 10.) The quantizer unit 80 maps the input signal to one of multiple digital output states. When the clock signal is active (or asserted), the quantizer unit 80 produces a digital output signal corresponding to the digital state. The quantizer unit 80 continues to produce the same digital output signal when the control signal is not active (i.e., deasserted). The digital output signal is thus updated every cycle of the clock signal. In at least some embodiments, the quantizer unit 80 is a voltage comparator followed by a latch, forming what is commonly referred to as a 1-bit analog-to-digital converter (ADC). The voltage comparator receives the output signal produced by the integrator unit 78 at a positive (+) input, and a fixed reference voltage at a negative (−) input. The voltage comparator continuously compares the output signal produced by the integrator unit 78 to the reference voltage, producing a higher output voltage (e.g., corresponding to a digital logic '1' level) when the output signal produced by the integrator unit 78 is greater than the reference voltage, and a lower output voltage e.g., corresponding to a digital logic '0' level) when the output signal produced by the integrator unit 78 is less than the reference voltage. (Of course, the digital logic values associated with high and low output voltages can be readily changed without significant effect on the circuit's operation.) The clock signal controls the latch such that when the clock signal is active for asserted), the output of the comparator propagates through the latch. The latch stores the output of the comparator and drives the stored output on an output terminal. When the clock signal is not active (or deasserted), the latch continues to drive the stored output on the output terminal.

Quantizer unit 80 has a single output terminal, which produces either the voltage corresponding to the digital logic '1' level, or the voltage corresponding to the digital logic '0' level, at the output terminal every cycle of the clock signal. The output of quantizer unit 80 can be viewed as a pulse density modulated signal having a relatively equal number of the higher voltage or "positive" pulses and the lower voltage or "negative" pulses per unit time when the position or deformation state of the sensing element 74 is near the null position, a relatively higher number of positive than negative pulses per unit time when the position or deformation state of the sensing element 74 is below the null position, and a relatively lower number of positive than negative pulses per unit time when the position or deformation state of the sensing element is above the null position.

As indicated in FIG. 6 and described above, the driver unit 84 in the quantized feedback loop 82 applies the quantizer output signal to the sensing element 74. The driver unit 84 may adjust the quantized signal values to appropriate voltage or current values to adjust the position or deformation of the sensing element 74. In other words, the driver unit 84 may take the form of a voltage level shifter. The output terminal of the driver unit 84 is connected to either a higher voltage level (e.g., a "+1" voltage), or to a lower voltage level (e.g., a "−1" voltage), dependent upon the voltage level (or digital logic level) of the digital output signal of the quantizer unit 80.

As indicated in FIG. 6, the output signal produced by the driver unit 84 operates on the sensing element 74. A feedback signal in the quantized feedback loop 82 causes a "restoring" force to be exerted on the sensing element 74 to counter the motion or deformation caused by the external stimulus. By virtue of the quantized output signal produced by the quantizer 80, the quantized feedback loop 82 exerts a quantized force on the sensing element 74. Note that because the feedback signal is quantized, it is nearly always too high or too low to precisely counter the external stimulus, causing the sensing element 74 to oscillate. The discrepancy between the quantized feedback signal and the external stimulus controls the magnitude of the signal supplied to the integrator 78, which in turn controls the time required for the integrator output to cross the threshold and cause a positive pulse to emerge in the quantizer output stream. In this manner, the integrator 78 serves to smooth out these discrepancies so that, on average, the position of the sensing element is returned to the null position. Even in the absence of an input stimulus, the quantized restoring force generated by or in response to the output of quantizer 80, tends to cause the sensing element 74 to oscillate symmetrically around the zero-input or null position or state of deformation.

An output unit 86 converts the quantizer output signal into a digital measurement by, e.g., counting each of the pulses received from the quantizer within a given interval. Control signals from the telemetry unit 70 can be used to coordinate this conversion. Thus the output unit 86 may include, for example, an n-bit binary counter that is latched and reset at periodic intervals. The counter may receive a clock signal from the sensor telemetry unit 70 (see FIGS. 4 and 5) at a clock input, and the single digital output signal produced by the quantizer unit 80 at an enable input. When the output of the quantizer unit 80 is the voltage corresponding to the digital logic '1' level, the counter is enabled and increments when the clock signal is active (or asserted). When the output of the quantizer unit 80 is the voltage corresponding to the digital logic '0' level, the counter is disabled and does not increment when the clock signal is active (or asserted). The digital output signal of the digital sensor 72 may be the n-bit word produced by the counter. Periodic reset signal assertions cause the count value to be latched and the counter cleared to begin the count for the subsequent interval.

The output unit 86 may also take the form of a low-pass or "decimation" filter. Because the clock rate of the quantizer unit 80 is typically much higher than the bandwidth of the stimulus, such filters can substantially enhance the measurement signal to noise ratio. For example, various types of "sinc" filters are known in the art with response graphs that approximate an ideal rectangular shape in the time domain and a sine function shape in frequency domain.

Figure 7:
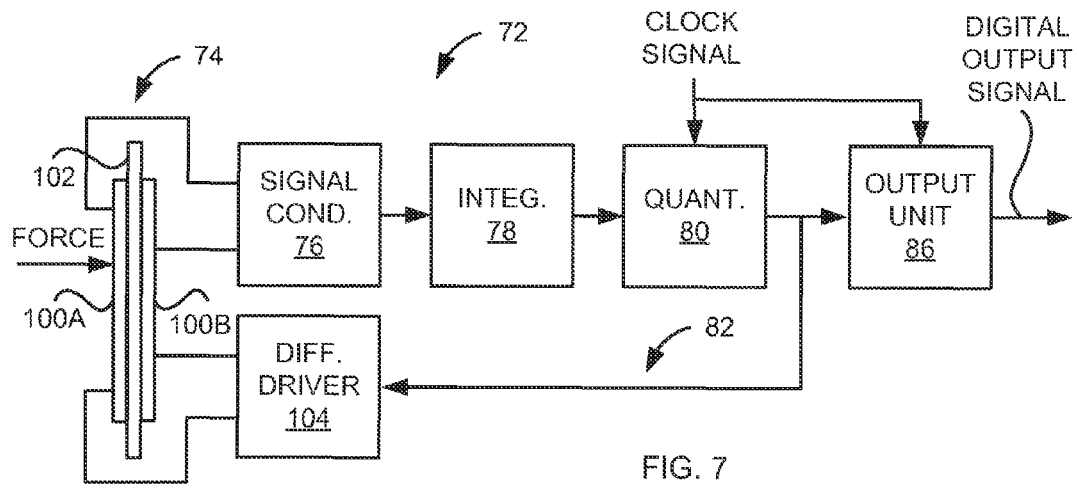
FIG. 7 is a diagram of an illustrative digital piezoelectric sensor embodiment.

FIG. 7 is a diagram of a digital sensor 72 that employs a piezoelectric transducer as a sensing element 74. The sensing element 74 includes a pair of piezoelectric discs 100A and 100B mounted on apposite sides of a flexible conductive sheet 102. The sensor further includes a differential driver unit 104 for providing a differential voltage signal to control electrodes on the piezoelectric discs 100A and 100B. Each of the piezoelectric discs 100A and 100B further includes sensing electrodes on the two opposed major surfaces, which develops an electrical voltage between the opposed major surfaces when the transducer deforms in response to motion or an applied force. In addition, when an electrical voltage is applied to the control electrodes, the piezoelectric disc deforms in response.

Hereinbelow, the two opposed major surfaces of the piezoelectric discs 100A and 100B will be referred to as an inner surface and an outer surface. The inner surface of the piezoelectric disc 100A is electrically coupled to one side of the flexible conductive sheet 102, and the inner surface of the piezoelectric disc 100B is electrically coupled to an opposite side of the flexible conductive sheet 102 as indicated in FIG. 7. Thus the inner surface of the piezoelectric disc 100A is electrically coupled to the inner surface of the piezoelectric disc 100B via the flexible conductive sheet 102.

The flexible conductive sheet 102 is normally substantially planar, defining a zero-input or null position of deformation. When an external mechanical force acts on the a flexible conductive sheet 102 as indicated in FIG. 7, the flexible conductive sheet 102 bends, deforming the piezoelectric discs 100A and 100B and causing the piezoelectric discs 100A and 100B to generate a differential voltage signal between the outer surfaces. This differential voltage signal is provided to the signal conditioning unit 76 as indicated in FIG. 7. The functions of the integrator unit 78, the quantizer unit 80, and the output unit 86 are described above.

In the embodiment of FIG. 7, a differential driver unit 104 receives the digital signal produced by the quantizer unit 80 as an input signal, uses the input signal to produce a differential voltage signal, and provides the differential voltage signal to the sensing element 74. The differential driver unit 104 provides the differential voltage signal to the outer surfaces of the piezoelectric discs 100A and 100B as indicated in FIG. 7. The differential voltage signal opposes the differential voltage signal generated between the outer surfaces in response to the external force. As a result, a restoring force is generated within the piezoelectric discs 100A and 1003 that tends to return the sensing element 74 to the zero-input or null position of deformation.

Figure 8:
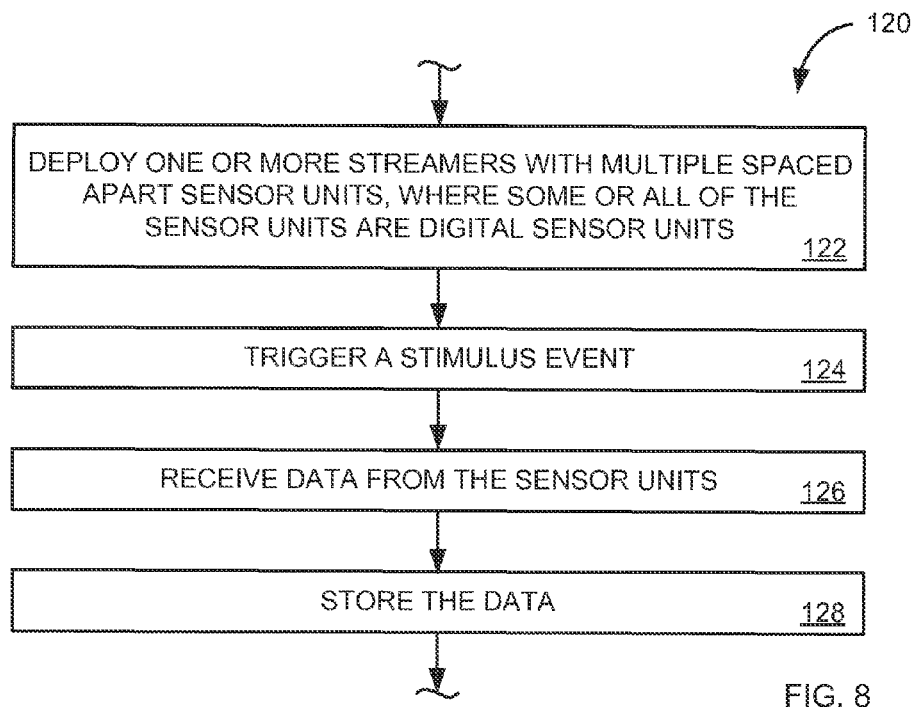
FIG. 8 is a flowchart of an illustrative method for acquiring data.

FIG. 8 is a flowchart of one embodiment of a method 120 for acquiring data. The data recording system 18 of FIGS. 1 and 2 may acquire data according to the method 120. During a block 122 of the method 120, one or more streamers (e.g., streamers 26 of FIGS. 1-3) are deployed, each streamer having multiple spaced apart sensor units. At least a portion of the sensor units comprise a digital sensor employing a quantized feedback loop to produce a digital output signal (e.g., digital sensors 72 of FIGS. 4-7).

During a block 124, a stimulus event is triggered (e.g., a seismic shot producing an acoustic signal). Data is received (e.g., by the data recording system 18 of FIGS. 1 and 2) from the digital sensor units during a block 126. During a block 128, the data is stored (e.g., by the data recording system 18 of FIGS. 1 and 2).

The systems and methods disclosed herein may benefit from recent technological advances that enable MEMS sensor devices to offer an increasing number of features crammed into a smaller space. Greater functionality and greater miniaturization may drive the development of a new class of mixed-signal silicon chips specifically designed for towed streamer applications. Traditional streamer electronics employ multiple chips which naturally require many input/output (I/O) pins to interface with each other. The circuit board traces that couple the chips together add a capacitive load that must be charged and discharged by the I/O drivers thereby requiring additional power and dissipating additional heat. Moreover, multiple chips consume space on the circuit board and often run afoul of footprint restrictions for the seismic sensors. Each of these issues can be addressed by integrating an application specific integrated circuit (ASIC) onto the same chip as the MEMS device. The integrated device, by requiring only one chip, sharply reduces the number of required I/O pins and the associated power dissipation by the I/O drivers charging and discharging capacitive loads of the circuit board traces. Also, because much of the chip size is associated with packaging, to support the I/O pins, the size of the integrated device may be expected to be smaller than the traditional chip assemblage.

Such technology may further be used to increase the number of sensors in a streamer if their power requirements are kept low. As explained above, providing an integrated sensor device may be expected to reduce power requirements. In addition, the power consumed by the integrated device is the product of the supply voltage and the current consumed by the device during operation. Significant current savings can be obtained by using complementary metal-oxide semiconductor (CMOS) technology to construct the device, but even then care should be taken to limit the three types of current consumption that occur in CMOS devices: cross-conduction current (also known as short-circuit through current), dynamic current, and static leakage current. Significant supply voltage reduction may also be achievable with this technology. Analog circuits, however, are extremely limited in terms of the current and voltage savings they can offer. Such circuits must operate on a continuous range of information, and as their signal strength (measured in terms of either voltage or current) falls, their noise margin drops apace. Discrete-state digital circuits, on the other hand, can function well at reduced voltages and currents since, by virtue of operating on binary information, digital circuits offer a wide wide noise margin and are inherently resistant to all but the most disruptive of events. Thus at least some of the the contemplated device embodiments employ digital circuitry designed to reduce the sensor devices' power requirements. The more sophisticated sensors will be capable of digitizing the signals with low-power but high-resolution digital converters. Digitized sensor signals provide the potentially desirable advantages of being more immune to noise and of being transmitted easily over wires or wirelessly using error-correcting protocols. In addition, digitized signals can be filtered and equalized to remove imperfections in the original signal.

It is further noted that high-performance micromachined motion sensors such as the MEMS devices disclosed herein employ feedback control to increase their dynamic range while maintaining linearity and bandwidth. Such devices with purely analog feedback control systems typically encounter electrostatic pull-in problems. Such problems can be avoided with the quantized feedback techniques disclosed herein, which by producing a pulse-density modulated output bitstream, further facilitate the employment of the digital sensor circuitry with the accompanying potential advantages outlined above. The cooperative high-resolution measurements of many digital sensors enable them to provide enhanced noise reduction in a typically noisy streamer environment.

Numerous variations and modifications will become apparent to those skilled in the art once the above disclosure is fully appreciated. For example, if transmitting measurements of each digital sensor measurement stream to the ship would require prohibitive amounts of bandwidth, the digital sensors may be partitioned into groups. The outputs of all the digital sensors in each group can be averaged or combined in some other fashion, and the combined stream transmitted to reduce the total number of measurement streams being transmitted to the ship. It is intended that the following claims be interpreted to embrace all such variations and modifications.

What is claimed is:

1. A geophysical survey system, comprising:
   at least one streamer having a plurality of spaced apart sensor units, at least one of the sensor units including at least one digital hydrophone sensor, the hydrophone sensor comprising a piezoelectric sensing element and employing a quantized feedback loop to produce a digital output signal, wherein the quantized feedback loop is configured to exert a quantized force on the piezoelectric sensing element; and
   a data recording system configured to collect and store data from the sensor units.

2. The system of claim 1, wherein the piezoelectric sensing element is configured to move or deform in response to an input stimulus.

3. The system of claim 2, wherein the at least one digital hydrophone sensor comprises an integrator coupled to the piezoelectric sensing element and a one-bit quantizer configured to produce a quantized signal responsive to an output of the integrator.

4. The system of claim 3, wherein the at least one digital hydrophone sensor comprises a counter configured to convert the quantized signal into the digital output signal.

5. The system of claim 2, wherein the at least one digital hydrophone sensor comprises an integrator coupled to the piezoelectric sensing element and a multi-bit quantizer configured to produce a quantized signal responsive to an output of the integrator.

6. The system of claim 5, wherein the at least one digital hydrophone sensor comprises a decimation filter that converts the quantized signal into the digital output signal.

7. The system of claim 1, wherein at least a portion of the sensor units are configured to produce an output signal dependent upon a seismic input signal.

8. The system of claim 1, wherein at least a portion of the sensor units provide a digital three-axis acceleration sensing and digital pressure sensing.

9. The system of claim 1, wherein at least a portion of the sensor units are spaced a distance of less than 59 inches (150 centimeters) from one another.

10. The system of claim 1, wherein at least a portion of the sensor units are spaced a distance of less than 14 inches (35 centimeters) from one another.

11. The system of claim 1, wherein the digital output signals of a number of sensor units are averaged together to form a combined digital output signal, and wherein the data recording system stores the combined digital output signal.

12. A geophysical survey method, comprising:
    deploying at least one streamer having a plurality of spaced apart sensor units, wherein at least a portion of the sensor units comprise a digital hydrophone sensor, the hydrophone sensor comprising a piezoelectric sensing element and employing a quantized feedback loop to produce a digital output signal, wherein the quantized feedback loop is configured to exert a first quantized force on the piezoelectric sensing element;
    triggering a stimulus event;
    receiving data from the sensor units; and
    storing the data.

13. The method of claim 12, wherein as part of producing a digital output signal, the digital hydrophone sensor transforms an input stimulus into motion or deformation of the piezoelectric sensing element.

14. The method of claim 13, wherein the digital hydrophone sensor integrates a sensing element signal and performs a one-bit quantization to produce a quantized signal.

15. The method of claim 14, wherein the digital hydrophone sensor exerts a second quantized force on the piezoelectric sensing element in response to the quantized signal.

16. The method of claim 15, wherein the digital hydrophone sensor counts values in the quantized signal to convert the quantized signal into the digital output signal.

17. The method of claim 12, wherein the digital output signals represent a seismic input signal.

18. The method of claim 12, wherein the digital output signals represent three-axis acceleration sensing and digital pressure sensing.

19. The method of claim 12, wherein deploying the at least one streamer includes constraining at least a portion of the sensor units to be spaced a distance of less than 14 inches (35 centimeters) from one another.

20. The method of claim 15, wherein the first quantized force is the same as the second quantized force.

* * * * *